United States Statutory Invention Registration [19]

[11] Reg. Number: H547

Lux et al.

[43] Published: Nov. 1, 1988

[54] X-RAY TUBE TARGET

[75] Inventors: Andrew L. Lux, Bay Village, Ohio; Robert M. Guezuraga, Roseville, Calif.

[73] Assignee: General Electric Company, Milwaukee, Wis.

[21] Appl. No.: 874,230

[22] Filed: Nov. 13, 1986

[51] Int. Cl.[4] ..... H01J 35/10

[52] U.S. Cl. ..... 378/144; 313/311; 228/120; 228/122; 228/263.12

[58] Field of Search ..... 378/143, 144; 313/311; 428/634, 670, 662; 228/263.12, 122, 120, 221

[56] References Cited

U.S. PATENT DOCUMENTS

| | | | |
|---|---|---|---|
| 3,710,170 | 1/1973 | Friedel | 378/144 |
| 3,731,128 | 5/1973 | Haberrecker | 378/144 |
| 3,890,521 | 6/1975 | Shroff | 378/144 |
| 4,119,879 | 10/1978 | Devine | 313/311 |
| 4,145,632 | 3/1979 | Devine, Jr. | 313/311 |
| 4,276,493 | 6/1981 | Srinivasa et al. | 378/144 |
| 4,352,041 | 9/1982 | Hubner et al. | 378/144 |
| 4,394,953 | 6/1983 | Sonnweber et al. | 228/263.12 |
| 4,516,255 | 5/1985 | Petter et al. | 313/311 |
| 4,597,095 | 6/1986 | Akpan | 378/144 |

*Primary Examiner*—John F. Terapane
*Assistant Examiner*—Eric Jorgensen
*Attorney, Agent, or Firm*—James H. Beusse; Douglas Stoner; Mark L. Mollon

[57] ABSTRACT

A composite target for an X-ray tube has a graphite substrate portion and a metal portion, the two portions being bonded together by successive interspersed layers of platinum and tantalum. The platinum layer is disposed between the graphite substrate portion and the tantalum layer. The tantalum layer acts to bond the metal portion to the platinum layer and also acts as an isolator to prevent the formation of carbides by migration through the bonding layers.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

X-RAY TUBE TARGET

BACKGROUND OF THE INVENTION

This invention relates generally to X-ray tube anode targets and, more particularly, to composite structures for X-ray tube rotating anode targets.

With increased demands being placed on the performance of X-ray tubes, manufacturers have looked for ways to increase the efficiency and/or enhance the longevity of the X-ray tube target. One approach has been to substitute a graphite material for the conventional molybdenum material used in the target body. Graphite offers the advantages of both significantly higher heat storage capacity and lower density. The increased heat storage capacity allows for sustained operation at higher temperatures, whereas the lower density allows for the use of bigger targets with less mechanical stress on the bearing materials.

Along with the advantages of the graphite targets as discussed above, there are certain problems to overcome when one chooses that material over the commonly used refractory metal. First, it is more difficult to attach the graphite body to the rotatable stem of the X-ray tube than it is to attach a metal disc. Secondly, when a focal track is applied directly to a graphite substrate, the rate of heat transfer from the focal track to the substrate is slower than when the focal track is attached to a metal substrate. Under certain operating conditions, this can cause an overheating of the focal track and resultant damage to the target.

A known approach for obtaining the advantages of each of the commonly used materials, i.e., refractory metal and graphite, is to use a combination of the two in a so-called composite substrate structure. This structure is commonly characterized by the use of a refractory metal disc which is attached to the stem and which has affixed to its front side an annular focal track. Attached to its rear side, in concentric relationship to the stem, is a graphite disc which is, in effect, piggybacked to the refractory metal disc. Such a combination provides for (a) an easy attachment of the metal disc to the stem, (b) a satisfactory heat flow path from the focal track to the metal disc and then to the graphite disc, and (c) the increased heat storage capacity along with the low density characteristics of the graphite disc.

With a composite target, one of the main concerns is that of attaching the graphite portion to the refractory metal portion in a satisfactory manner. In addition to the obvious strength requirements, which are substantial when considering the rotational speeds of up to 10,000 RPM, relatively high operating temperatures on the order of 1,200° C. must also be accomodated. In addition, the metal and graphite elements must be adequately joined so as to provide for the maximum transfer of heat from the metal portion to the graphite portion. For example, it has been found that if there are air pockets between the two portions, the heat transfer characteristics will be inadequate in those sections.

A common method for joining the graphite portion to the metal portion is that of furnace or induction brazing with the use of an intermediate metal. Zirconium has been commonly used for that purpose because of its excellent flow and wetting characteristics. A problem that arises with the use of zirconium, however, is the formation of carbides at the interface between the zirconium and the graphite. Since the carbides tend to embrittle the joint, the strength of a joint is inversely related to both the amount of carbide formed and the thickness of the carbide layer. The amount of the carbide formed depends on the thermal history of the component during both the manufacturing and the operational phases thereof, neither of which can be adequately controlled so as to ensure that the undesirable carbides are not formed.

Other materials have been found useful in attaching the graphite portion to the metal portion of the target. A group of such materials that has been particularly suitable for such an attachment are those discussed in U.S. Pat. No. 4,145,632, issued on Mar. 20, 1979 and assigned to the assignee of the present invention. Those materials, and platinum in particular, were found to have a significant advantage over the zirconium material because of their relative insusceptibility to forming a carbide at the graphite platinum interface.

In the composite target structure, the metal portion is generally formed of a molybdenum alloy commonly known as TZM. While TZM is the preferred material in this application, MT104 can be substituted for TZM. This alloy, in addition to molybdenum, contains about 0.5% titanium, 0.07% zirconium and 0.05% carbon. In constructing a target of TZM or MT104 and graphite using a platinum bond, it has been found that when the platinum is molten, the carbon from the graphite portion diffuses through and forms a molybdenum carbide ($Mo_2C$) layer between the platinum and the TZM. In addition to forming a weaker bond, the $Mo_2C$ layer has also been found to deteriorate with thermal cycling of the target structure. Thus, there have been found some disadvantages in using only platinum to braze graphite to TZM.

It is therefore an object of the present invention to provide an improved composite X-ray target with a brazed interconnection having good strength and heat transfer characteristics.

Another object of the present invention is to provide a method and brazing material for minimizing carbide formations in braze joints between a graphite element and a metal element.

These objects and other features and advantages will become more readily apparent upon reference to the following description when taken in conjunction with the appended drawings.

SUMMARY OF THE INVENTION

Briefly, in accordance with one aspect of the present invention, a relatively thin layer of tantalum is applied to the metal element to form a shield. A disc of platinum is then applied to the tantalum, and the graphite portion is placed over the platinum disc. The combination is thereafter heated to cause a brazing together of the materials. In this process, the platinum becomes the primary binding material, while the thin layer of tantalum functions to isolate the metal portion from direct contact with the graphite, a combination which would tend to form carbides.

By another aspect of the invention, the tantalum is applied in the form of a film of a few microns thick by using tantalum inks, screen printed on the metal, with the resulting wet film being dried and fired to anneal the tantalum to the metal portion. The platinum layer and graphite substrate is then applied and the combination is heated to effect a brazing action. Alternately, the tantalum coat could be applied by plasma spraying using the same firing and annealing steps.

In the drawings as hereinafter described, a preferred embodiment is depicted. However, various other modifications and alternate constructions can be made thereto without departing from the true spirit and scope of the invention.

DESCRIPTION OF THE PREFERRED EMBODIMENT

Figure 1:
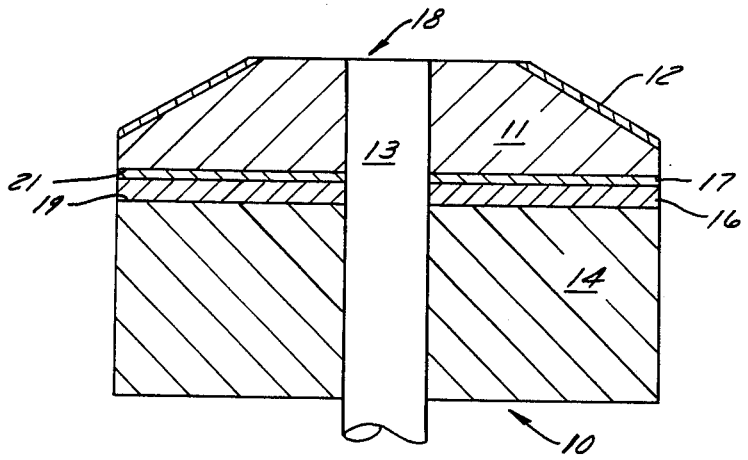
FIG. 1 is a sectional view of the X-ray target in accordance with the preferred embodiment of the invention.

Referring now to FIG. 1, there is shown an anode target for use in a rotating anode X-ray tube in accordance with the invention. The assembly, indicated generally at 10, includes a metal disc 11 having a focal track 12 applied to a forward face thereof for producing X-rays when bombarded by the electrons from a cathode in a conventional manner. The disc 11 is composed of a suitable refractory metal such as molybdenum or molybdenum alloy (TZM or MT104). The conventional focal track 12 disposed thereon is composed of a tungsten or a tungsten/rhenium alloy material. The disc 11 is attached to the stem 13 by a conventional method, such as by brazing, diffusion bonding, or mechanical attachment.

Attached to a rear face of the metal disc 11 is a graphite disc 14, the attachment being made by the interspersing of adjacent layers of platinum and tantalum, indicated generally by the numerals 16 and 17, respectively, in a manner to be described hereinafter. The primary purpose of the graphite disc 14 is to provide a heat sink for the heat which is transferred through the metal disc 11 from the focal track 11, without contributing significantly to the mass of the target assembly.

Figure 2:
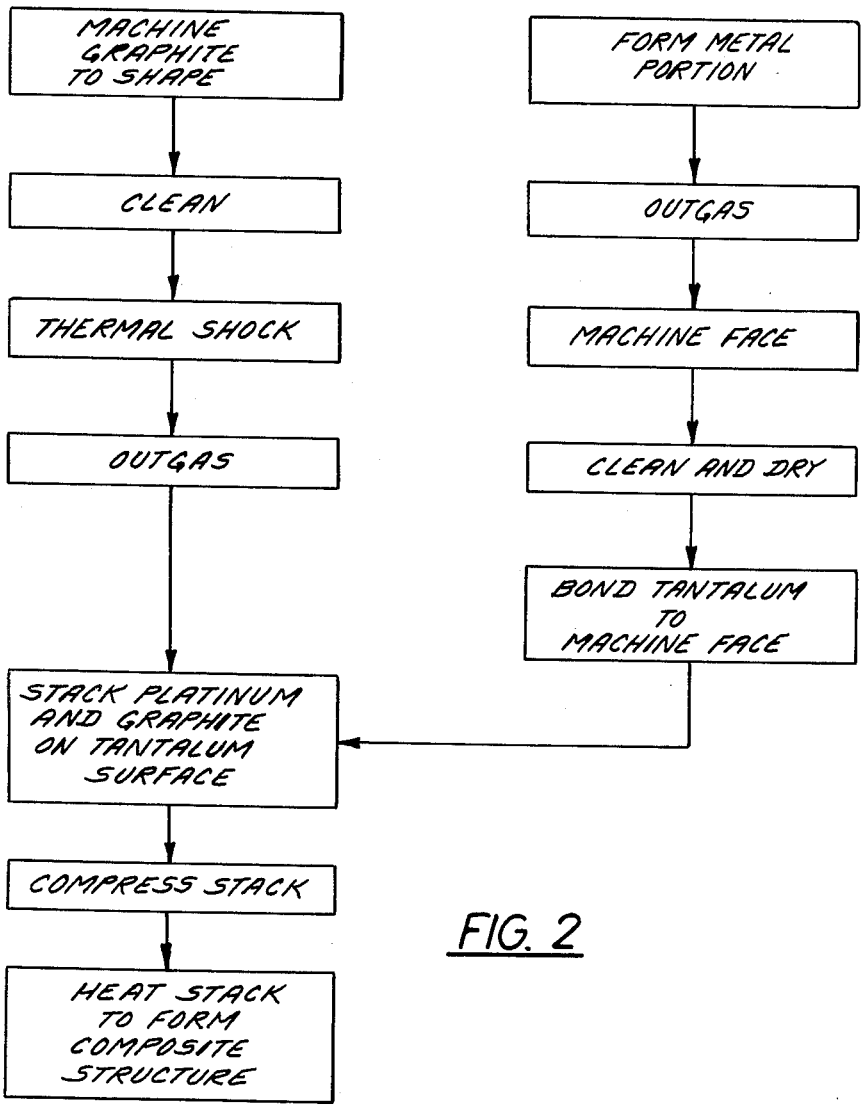
FIG. 2 is a flow diagram showing the process of anode fabrication in accordance with the preferred embodiment of the invention.

A method for fabricating the anode assembly is shown in FIG. 2. For purposes of discussion, let us assume that the metal disc element 11 and graphite disc element 14 have been formed by conventional methods with each having a central bore 18 for receiving in close-fit relationship the stem 13 of the X-ray tube.

The graphite element 14 is first cleaned, with particular care being given to the flat surface 19 to which the flat surface 21 of the metal element 11 is to be attached. The surfaces of the graphite disc 14 are preferably treated by ultrasonic cleaning or other suitable surface treatment processes to prevent the release of graphite particles (dusting) during operation of the tube.

The preferred process for treating the graphite element 14 actually begins in the machine process when the graphite element is formed from a billet of raw graphite. In between machine steps, a pryolytic carbon coating is applied to the surface of the machined graphite in order to minimize dust production during machining. The pyrolitic carbon coating is generally applied by a chemical vapored deposition process well known in the art. After the element 14 has been machined, it is processed further by outgassing the graphite by placing it in an oven or furnace at 1900° C. for approximately one hour. If it is preferred that a skin cut over the graphite surface be made using a dry lathe process to establish a smooth outer surface, that process is normally completed before the graphite is outgassed. After outgassing, a thermal shock process is also applied in order to clean pores in the surface of the graphite to enhance the bonding. Thermal shock is performed by heating the graphite in air to a temperature of about 250° C. to 300° C. and then quickly submerging the heated graphite in de-ionized water at room temperature. After thermal shocking, the graphite is again outgassed by heating to the elevated temperature of 1900° C. for about one hour. The processed graphite is then ready for brazing to a metal element.

As stated previously, the metal portion of the anode target is preferably formed of TZM or MT104. Some of the same steps applied to the graphite element are also applied to the TZM or MT104 metal element. In particular, the TZM is vacuum fired to 1900° C. for about one hour for outgassing. After outgassing, the TZM face which is to be attached to the graphite surface is finish machined to true up the flatness of the surface since outgassing at the elevated temperature tends to cause the metal element to warp. After machining, the TZM metal element is cleaned, typically by using an ultrasonic methanol bath. If necessary, the surface to be bonded may also be shot peened. After drying from the ultrasonic cleaning, the TZM or MT104 metal element is then ready to be bonded to the graphite element.

A preferred method of preparing the TZM or MT104 element for bonding to the graphite element is to coat the TZM or MT104 surface with a slurry of tantalum. The tantalum layer is then formed by firing the cap element to cause the tantalum to bond to the TZM material. A composite structure is thereafter formed by placing the TZM or MT104 element face downward, placing a washer or foil layer of platinum over the exposed tantalum layer, and then positioning the graphite material over the platinum washer or foil. Preferably, several assemblies, typically three or four, may be formed concurrently by stacking one on top of the other. In such an arrangement, the second composite structure would be arranged such that its graphite element is positioned adjacent the graphite element in the first target structure. The final target structure would then be inverted so that its metal element is placed adjacent the metal element in the second target structure.

After stacking in this fashion, a weight, preferably about 16 pounds, is placed on top of the three stacked structures, and the stack structure is placed into a vacuum chamber furnace. The furnace is typically pulled to a vacuum of about $10^{-5}$ torr. The first step in the process is to heat the furnace to about 1800° C. and to hold that temperature for approximately five minutes to allow the platinum to melt. The oven temperature is then allowed to cool in vacuum backdown to approximately 450° C. At 450° C., the oven is filled with argon gas to force a rapid cooling to about 100° C. At that point the oven is opened to allow removal of the bonded anode target structures. This particular process has been found to provide the best bonds without forming carbide layers which tend to be brittle and weaken the bonding between the platinum and graphite.

It should be mentioned that other non-carbide forming elements may be used in place of the platinum in the manner described above. For example, any of the elements, rhodium, osbium, rethinium, palladium, or a platinum chromium alloy may be used as the bonding material. The required characteristics are, first of all, that the material be essentially non-carbide forming, and secondly, that it be susceptible to the spreading of a relatively thin layer. For example, layers varying between 1.5 and 2.5 mils have been used successfully. Optimum firing conditions using such layers produce a 1 to 10 micron thick "getter" zone which is a multi-element system comprised of the tantalum, platinum, molybdenum and carbon. The structure tends to be free of the cracked intermediate zones characteristic of platinum-zirconium bonding.

The platinum layer tends to work best when prepared in a thickness of 1 to 3 mils thick and brazed at a temperature of 10° C. to 25° C. above the liquidous temperature of the filler material. Pure platinum has relatively low high temperature properties. At least a 25% increase in elevated temperature properties, i.e., tensile strength, can be achieved by using platinum alloys such as 95% platinum 5% nickel, or 90% platinum 10% rhodium, or 95% platinum 5% zirconium, or 95% platinum 5% tungsten. The utilization of platinum as a filler metal can be economized by plating an area less than 1 mil thick onto and within the graphite bulk by PVD technology. PVD technology involves placing platinum into a specially designed carrier and placing the to be brazed area of the graphite above the carrier. The platinum is then heated up to its liquidous point and held for periods up to 5 hours. This causes the platinum to diffuse into the graphite material.

While tantalum has been found to be the preferred form of material for bonding to the TZM or MT104 surface to prevent formation of molybdenum carbide layers, some success has also been achieved by using platinum in combination with tungsten, rhodium, and nickel.

It will be appreciated that what has been described is a unique method of bonding a graphite element to a metal element which allows formation of bonds without carbide layers. This method and apparatus provides an improvement over prior methods in that it allows the structure thus formed to operate at higher temperatures than was possible in the prior art. Specifically, the use of zirconium as a brazing alloy typically limited the use of the anode target to a maximum temperature of about 1570° C. By eliminating zirconium and utilizing the platinum-tantalum bonding technique, the anode target can be allowed to work at higher temperatures.

What is claimed is:

1. A composite target for an X-ray tube comprising a graphite substrate portion and a metal portion, the two portions being bonded together by successive interspersed layers of platinum and tantalum, wherein said platinum layer is disposed between said graphite substrate portion and said tantalum layer, said tantalum layer being relatively thin compared to said platinum layer and forming an isolator preventing formation of carbides in the metal portion, said platinum layer being between 1 and 3 mils in thickness and acting to bond said graphite layer to said metal portion.

2. In a composite X-ray target of the type having a graphite substrate portion to which a metal portion is attached, a bonding structure comprising a first layer formed of a non carbide-forming material selected from the group consisting of platinum, palladium and rhodium bonded to said graphite portion, and a second layer composed of tantalum and disposed between and acting to bond said first layer to said metal portion, wherein said second layer acts as an insolator to prevent the formation of carbides, said second layer being substantially thinner than said first layer, said first layer being between 1 and 3 mils in thickness and acting to bond said graphite portion to said metal portion.

3. A method of joining a metal portion of an X-ray target to a graphite substrate portion thereof comprising the steps of:

(1) applying a first layer of tantalum to one face of the metal portion;

(1a) heating the metal portion and tantalum layer to a temperature sufficient to bond the tantalum to the metal portion;

(2) orienting the metal portion and the graphite substrate portion to form a target structure comprising the two portions with the tantalum layer therebetween;

(3) positioning a washer of platinum between the tantalum layer and the graphite portion;

(4) compressing the target structure;

(5) heating the compressed structure to effect melting of the platinum washer to thereby braze the metal portion to the graphite portion.

4. The method of claim 3 wherein the step of heating includes the substeps of:

(1) positioning the compressed target structure in a vacuum chamber furnace;

(2) heating the furnace to above the melting point of platinum;

(3) sequentially reducing the furnace temperature to a first intermediate value under vacuum followed by a quick convective cool to room temperature under argon gas protection.

5. The method of claim 3 wherein the step of compressing the target structure comprises the substeps of:

(1) stacking three or four target structures in a single stack; and (2) compressing the stack with a weight of approximately 16 pounds.

6. A method for constructing a composite X-ray target of a graphite substrate portion bonded to a metal portion comprising the steps of:

(1) forming the graphite portion by (a) machining a graphite billet to an appropriate shape for the target portion;

(b) outgassing the machined portion by elevated heating for a predetermined time;

(c) thermally shocking the graphite portion by heating to a predetermined temperature and rapidly cooling by submersion in de-ionized water whereby the graphite portion is cleaned;

(d) repeating the step (b) of outgassing;

(2) preparing the metal portion by (a) heating an appropriately shaped portion to an elevated temperature for a predetermined time to effect outgassing;

(b) machining the outgassed portion to assure a flat bonding surface;

(c) cleaning the machined metal portion with a non-residue forming chemical;

(d) air dry the cleaned portion;

(3) bonding a tantalum layer to one face of the metal portion;

(4) arranging the graphite portion with a mating face toward the tantalum layer on the metal portion;

(5) positioning a platinum washer between the graphite portion and metal portion to form a target stack;

(6) compressing the target stack; and (7) heating the target stack to effect a brazing action of the platinum washer to form the composite structure.

* * * * *